(12) United States Patent
Taylor et al.

(10) Patent No.: US 10,610,831 B2
(45) Date of Patent: Apr. 7, 2020

(54) SINGLE WELD CONTACTOR

(71) Applicant: 3M INNOVATIVE PROPERTIES COMPANY, St. Paul, MN (US)

(72) Inventors: Gareth P. Taylor, Indian Trail, NC (US); Timothy D. Price, Monroe, NC (US); Ronnie E. Queen, Gastonia, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 40 days.

(21) Appl. No.: 15/560,040

(22) PCT Filed: Jun. 20, 2016

(86) PCT No.: PCT/US2016/038328
§ 371 (c)(1),
(2) Date: Sep. 20, 2017

(87) PCT Pub. No.: WO2016/209761
PCT Pub. Date: Dec. 29, 2016

(65) Prior Publication Data
US 2018/0093226 A1  Apr. 5, 2018

Related U.S. Application Data

(60) Provisional application No. 62/182,684, filed on Jun. 22, 2015.

(51) Int. Cl.
*B01D 63/02* (2006.01)
*B01D 19/00* (2006.01)
(Continued)

(52) U.S. Cl.
CPC ....... *B01D 63/024* (2013.01); *B01D 19/0031* (2013.01); *B01D 27/08* (2013.01);
(Continued)

(58) Field of Classification Search
CPC .... B01D 63/024; B01D 63/025; B01D 61/00; B01D 19/0031; B01D 63/021;
(Continued)

(56) References Cited

U.S. PATENT DOCUMENTS 5,059,374 A * 10/1991 Krueger ................. B01D 53/22
210/321.61
7,638,049 B2  12/2009 Sengupta
(Continued)

FOREIGN PATENT DOCUMENTS

WO   WO 2006/081059   8/2006

OTHER PUBLICATIONS

Extended Search Report dated Feb. 5, 2019 for EP Appl. No. 16815105.8 (3 pages).
(Continued)

*Primary Examiner* — Lucas A Stelling
*Assistant Examiner* — Angel Olivera
(74) *Attorney, Agent, or Firm* — Scott A. Baum

(57) ABSTRACT

A membrane contactor includes: a cap has an internally beveled surface and a cap port; a cup body has an externally beveled surface in sealing engagement with the internally beveled surface, a side port on a side of the cup body and an end port located on an end of the cup body; and a membrane cartridge is located within the cup body, is sealed to an open end of the cup body, and is in sealed fluid communication with the end port. A method of making a membrane contactor includes the steps of: sealingly mating a perforated center of a membrane contactor with the end port of a cup body; sealingly joining an end of the membrane cartridge adjacent an open end of the cup body; and sealingly joining a beveled surface of the cap to a beveled external surface of the cup body.

5 Claims, 4 Drawing Sheets

(51) Int. Cl.
| | | |
|---|---|---|
| *B01D 69/08* | (2006.01) | |
| *B01D 27/08* | (2006.01) | |
| *B01D 29/00* | (2006.01) | |
| *B01D 29/88* | (2006.01) | |
| *B01D 35/30* | (2006.01) | |
| *B01D 27/00* | (2006.01) | |
| *B01D 29/90* | (2006.01) | |
| *B01D 61/00* | (2006.01) | |

(52) U.S. Cl.
CPC .......... *B01D 29/009* (2013.01); *B01D 29/88* (2013.01); *B01D 35/30* (2013.01); *B01D 61/00* (2013.01); *B01D 63/02* (2013.01); *B01D 63/021* (2013.01); *B01D 63/025* (2013.01); *B01D 69/08* (2013.01); *B01D 19/00* (2013.01); *B01D 27/005* (2013.01); *B01D 29/00* (2013.01); *B01D 29/908* (2013.01); *B01D 63/022* (2013.01); *B01D 2313/04* (2013.01); *B01D 2313/21* (2013.01)

(58) Field of Classification Search
CPC ............... B01D 63/02; B01D 2313/04; B01D 2313/21; B01D 35/30; B01D 29/88; B01D 29/009; B01D 27/08; B01D 69/08; B01D 63/022; B01D 29/908; B01D 27/005; B01D 19/00; B01D 29/00
See application file for complete search history.

(56) References Cited

U.S. PATENT DOCUMENTS

| | | |
|---|---|---|
| 2001/0035093 A1 | 11/2001 | Yokota |
| 2005/0194305 A1 | 9/2005 | Vido |
| 2006/0081524 A1* | 4/2006 | Sengupta ........... B01D 19/0031 210/321.88 |
| 2006/0163140 A1* | 7/2006 | Taylor ................. B01D 63/022 210/321.61 |
| 2007/0278145 A1 | 12/2007 | Taylor |

OTHER PUBLICATIONS

International Search Report for PCT/US2016/038328 (dated Oct. 10, 2016) 4 pages.

\* cited by examiner

SINGLE WELD CONTACTOR

FIELD

In accordance with at least selected embodiments, the present disclosure is directed to novel or improved membrane contactors.

BACKGROUND

Membrane contactors are devices used to, among other things, degas liquids. For example, membrane contactors may be used to degas the ink used in, for example, industrial printers.

Hollow fiber membrane contactors typically operate on a diffusion principle. Such membrane contactors typically have a shell side and a lumen (or tube) side, and these sides are separated with a membrane, for example, a microporous membrane. In operation, the gas entrained liquid is introduced into one side of the contactor, while vacuum or a combination of vacuum and swept gas is passed through the other side. As the liquid passes through its side, the gas diffuses across the membrane into the other side.

Two small membrane contactors are illustrated in FIGS. 1 and 2 (both prior art). Such Liqui-Cel® brand contactors are commercially available from the Membrana-Charlotte Division of Celgard, LLC of Charlotte, N.C. While these are excellent small membrane contactors, there is still a need for improved small membrane contactors or improved production methods for such contactors for at least certain applications.

SUMMARY OF THE INVENTION

In accordance with at least selected embodiments, aspects or objects, the present disclosure or invention may address the above needs, and/or is directed to novel or improved membrane contactors, small or compact membrane contactors, single weld membrane contactors, small single weld membrane contactors, and/or related methods of manufacture and/or use. In accordance with at least certain embodiments, the present disclosure is directed new or improved small single weld contactors and/or methods for production thereof. In accordance with at least particular embodiments, the present disclosure is directed new or improved small single weld hollow fiber membrane contactors including: a cap has an internally beveled surface and a cap port; a cup body has an externally beveled surface in sealing engagement with the internally beveled surface and a side port on a side of the cup body and an end port located on an end of the cup body; and a membrane cartridge is located within the cup body, is sealed to an open end of the cup body, and is in sealed fluid communication with the end port, and/or new or improved methods of making a membrane contactor including the steps of: sealingly mating a perforated center of a membrane contactor with the end port of a cup body; sealingly joining an end of the membrane cartridge adjacent an open end of the cup body; and sealingly joining a beveled surface of the cap to a beveled external surface of the cup body.

With reference again to the two small membrane contactors illustrated in FIGS. 1 and 2 (both prior art), while these are excellent small membrane contactors, improvements in their construction and/or manufacture could drive down cost, enhance performance for certain applications, or both. FIG. 1 shows the 1×3 contactor; it requires two welds, $W_1$ and $W_2$ to seal the cap to the body and the membrane cartridge. FIG. 2 shows the 2×6 contactor; it has two caps $C_1$ and $C_2$.

In at least one embodiment, a new or improved membrane contactor includes: a cap has an internally beveled surface and a cap port; a cup body has an externally beveled surface in sealing engagement with the internally beveled surface and a side port on a side of the cup body and an end port located on an end of the cup body; and a membrane cartridge is located within the cup body, is sealed to an open end of the cup body, and is in sealed fluid communication with the end port. Such an inventive contactor may be made by a method of making a membrane contactor includes the steps of: sealingly mating a perforated center of a membrane contactor with the end port of a cup body; sealingly joining an end of the membrane cartridge adjacent an open end of the cup body; and sealingly joining a beveled surface of the cap to a beveled external surface of the cup body.

DESCRIPTION OF THE DRAWINGS

For the purpose of illustrating the invention, there is shown in the drawings prior contactors and a form that is presently preferred; it being understood, however, that this invention is not limited to the precise arrangements and instrumentalities shown in FIGS. 3A-C.

DESCRIPTION OF THE INVENTION

Figure 1:
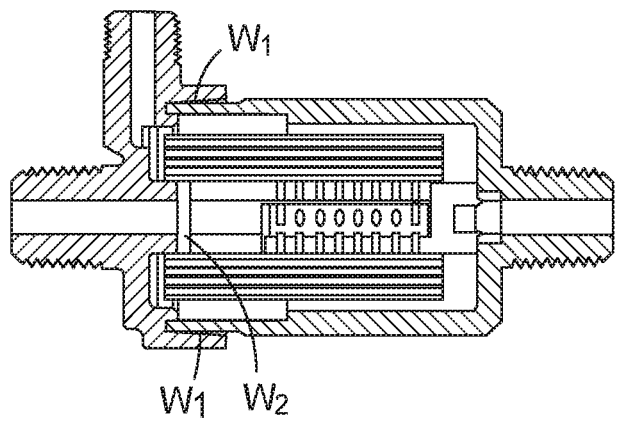
FIG. 1 is a prior art membrane contactor.
Figure 2:
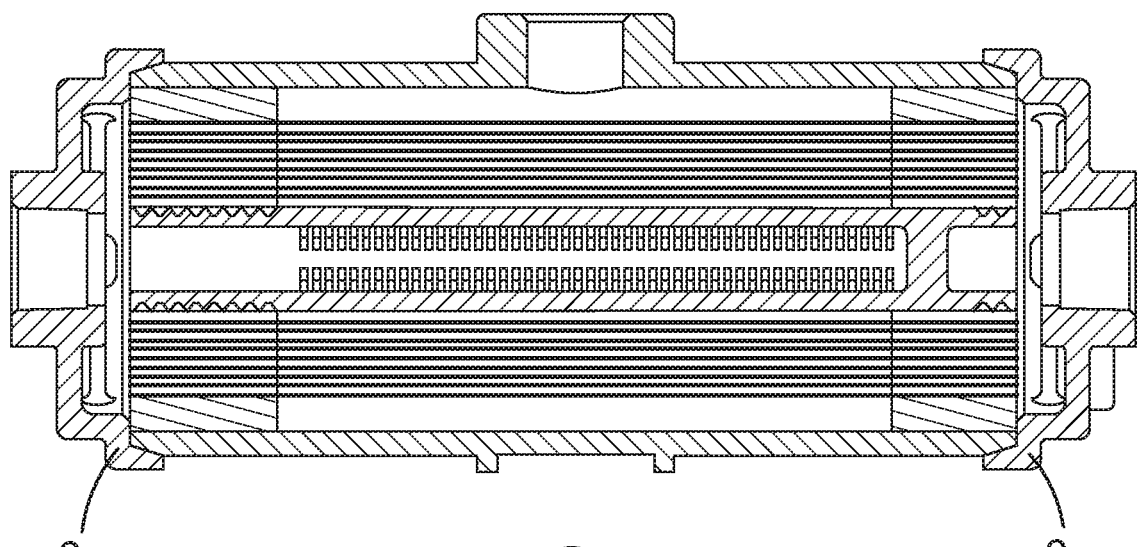
FIG. 2 is a prior art membrane contactor.
Figure 3A:
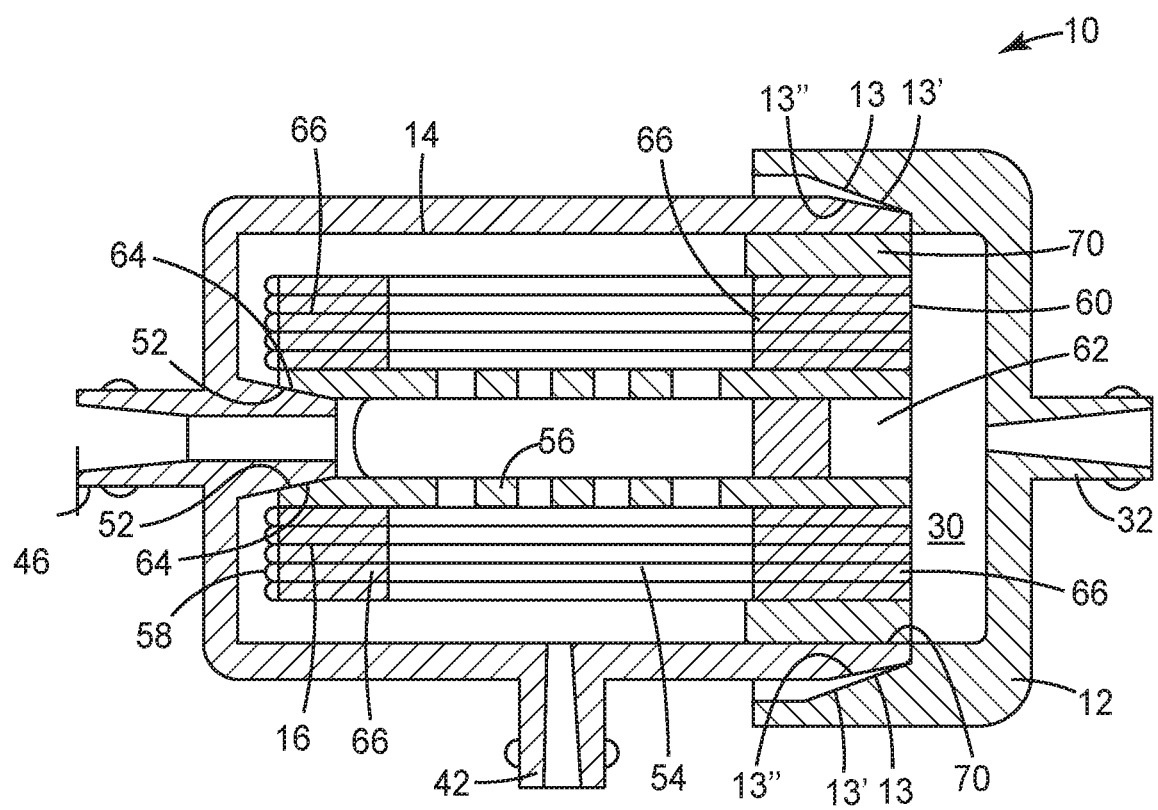
FIGS. 3A-C show an embodiment of the inventive membrane contactor.
Figure 3B:
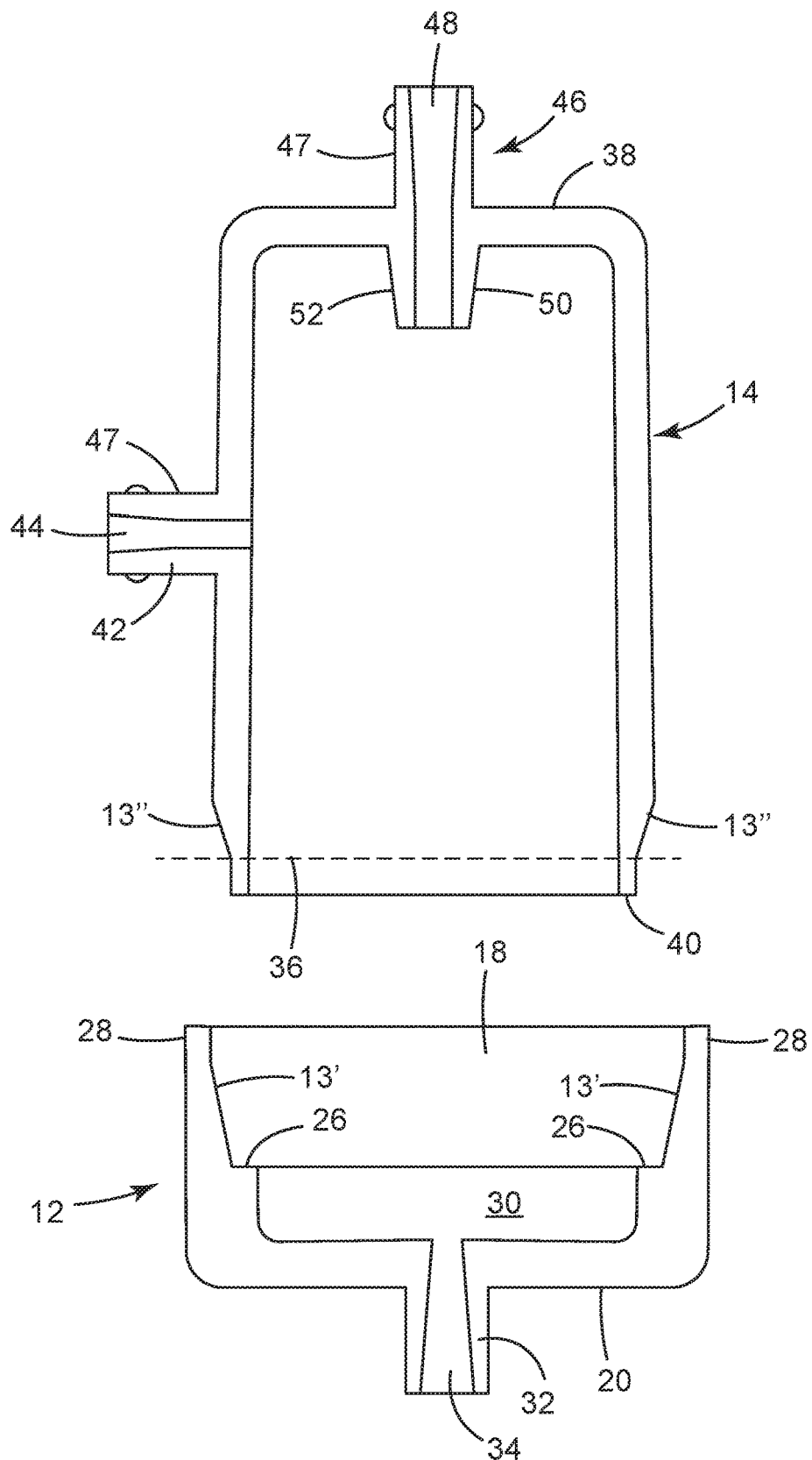
Figure 3C:
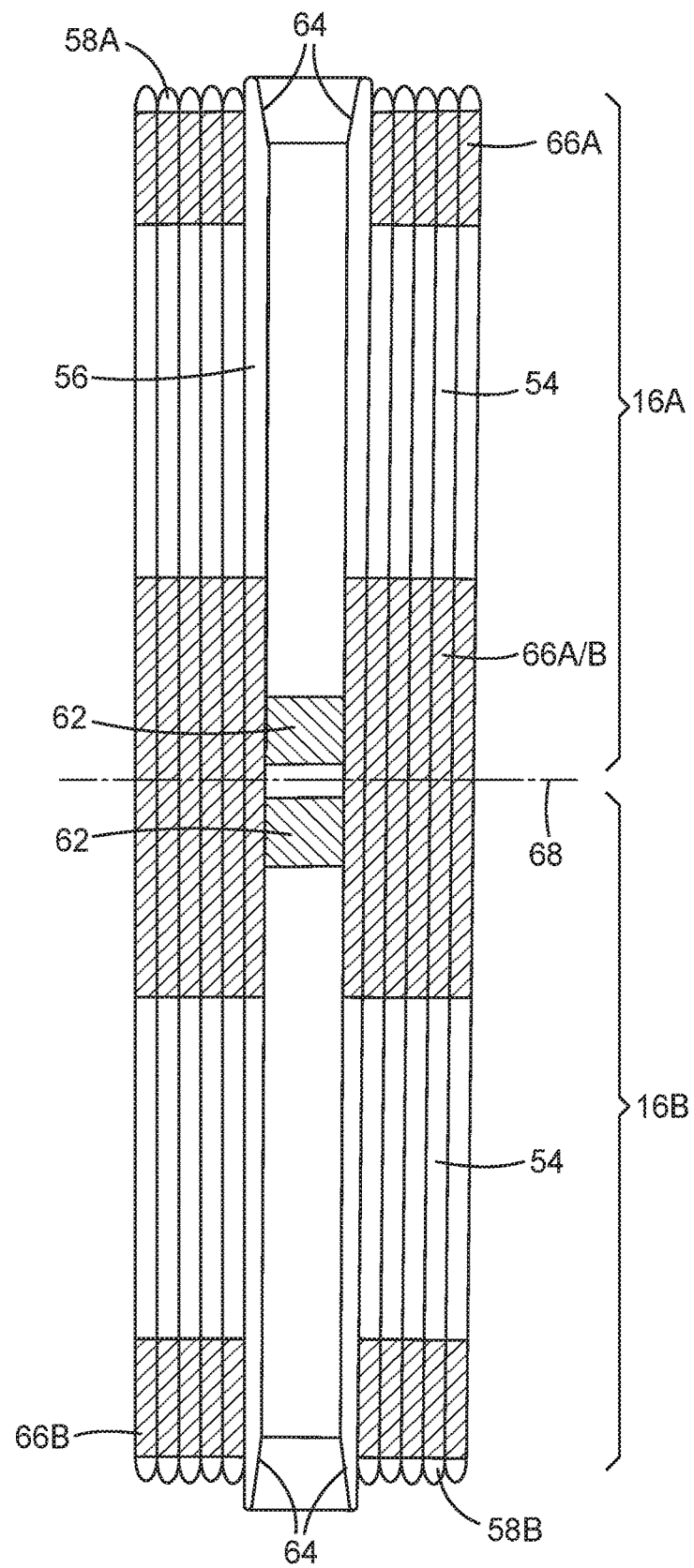

Referring to FIGS. 3A-C, there is shown an embodiment of the inventive membrane contactor 10. Contactor 10 generally includes a cap 12, a cup body 14, and membrane cartridge 16. The membrane cartridge 16 may be located within the cup body 14.

The cap 12 and cup body 14 are sealingly joined by joint 13 along joining surfaces 13' and 13". Surface 13' may be an internally facing joining surface located on cap 12, and surface 13" may be an externally facing joining surface located on cup body 14. The joint 13 is illustrated as a scarf joint (i.e., surfaces 13' and 13" are beveled), but joint 13 may be a shear joint (i.e., surfaces 13' and 13" are parallel to the axis of the contactor 10), or a butt joint or any other combination of joint designs. Hereinafter, the contactor 10 will be illustrated with the scarf joint, but the shear joint may be used in place thereof.

Cap 12 may be generally cup shaped (e.g., circular cross-section) with an open end 18 and a closed end 20, see FIG. 3B. Cap 12 may also include an internally beveled surface 13', a shoulder 26, a skirt 28, a headspace 30, and a cap port 32 with an opening 34 therethrough. Cap port 32 may be a nipple extending away from cap 12. Beveled surface 13' may have a shallow angle, for example <30°, or 4°–15°. Skirt 28 extends beyond joint 13, thereby concealing joint 13. Nipple is a sealable fitting, for example—a Luer (or medical) fitting, NPT, straight tube, compression, quick-connect, or any other suitable fitting.

Cup body 14 may be generally cup shaped (e.g., circular cross-section) with an open end 36 and a closed end 38, see FIG. 3B. Cup body 14 may also include an externally beveled surface 13", a shoulder 40, a side port 42 with an opening 44 therethrough, and end port 46 with an opening 48 therethrough. Beveled surface 13" may complement the angle of beveled surface 13'. Side port 42 may be a nipple 47 extending away from the cup body 14. End port 46 may include a nipple extending away from the cup body 14. End port 46 also includes an inwardly extending nipple 50 with a mating external surface 52. Mating external surface 52 may be beveled. Mating external surface 52 may have a shallow angle, for example <30°, or 4°-15°. Nipple is a sealable fitting, for example—a Luer (or medical) fitting, NPT, straight tube, compression, quick-connect, or any other suitable fitting.

Membrane cartridge 16 generally includes a bundle of membranes (e.g., hollow fiber membranes) 54 surrounding and bonded to a perforated center tube 56, see FIG. 3A. The cartridge 16 has a first end 58 and a second end 60. A plug 62 is disposed in the center tube 56 adjacent second end 60. A mating internal surface 64 is located at the first end of the perforated center tube 56 adjacent the first end 58. Mating internal surface 64 may be beveled. Mating internal surface 64 may complement the angle of mating external surface 52. The hollow fiber membranes of bundle 56 are closed at the first end 58 and open at the second end 60. The bundle 54 may be bonded to the center tube 56 by a potting material. Potting material (e.g., epoxy, polyurethane, thermoplastic polymer, and/or adhesive) may be formed into walls 66 at the first end 58 and the second end 60 of the cartridge 16.

FIG. 3C illustrates that cartridge 16 may be made two-at-a-time, cartridge 16A and 16B. The membrane are wound around the center tube 56, so that the end of the membranes are closed 58A and 58B. If the membrane is a plurality of hollow fibers, the hollow fibers may be knit into a fabric (the lateral edges of the fabric will have closed or looped over ends) and then wound around the center tube 56. The membranes may be joined to the center tube 56 in a conventional fashion, i.e., potting at 66A, 66A/B, and 66B. Then, cartridge 16A and cartridge 16B are separated (e.g., cut apart) along line 68. Plugs 62 may be formed at the same time that the potting at 66A/B are formed.

In one embodiment, when assembled, see FIG. 3A, (or assembling), cartridge 16 is inserted into cup body 14 by engaging mating surface 64 of the center tube 56 with the mating surface 52 of the end port 46. These mating surfaces 52 and 64 must be held in sealing engagement when cartridge 16 is fixed to cup body 14. This sealing engagement may be accomplished by luer lock, press fit, interference fit, snap fit, threading, welding, and/or gluing. These mating surfaces 52 and 64 may be held in sealing engagement when cartridge 16 is fixed to cup body 14 by, for example, material 70 or a mechanism (not shown). The material 70 or the mechanism also seals the cartridge 16 and cup body 14 in fluid tight engagement. Material 70 may be any material conventionally known in the art. Such materials 70 include potting and/or glue. Such mechanisms include threading, clips, o-rings, snap fittings. Once the cartridge 16 is fixed into cup body 14, cap 12 is joined to the assembly of the cartridge 14 and cup body 16 via joint 13. Joint 13 is a fluid tight joint. Joint 13 may be a welded joint or glued joint. The welded joint may be formed by spin welding. Headspace 30 is formed between cap 12 and the assembly of cup body 14 and cartridge 16, when shoulder 26 of cap 12 rest on shoulder 40 of cup body 14.

In one embodiment, in operation, gas entrained liquid enters contactor 10 via end port 46 and travels along center tube 56 until blocked by plug 62. The gas entrained liquid exits the perforated center tube 56 and travels radially across the external surfaces of the hollow fiber membranes, and exits contactor 10 via side port 42 (this path defines the shell side). Vacuum or vacuum/sweep gas are introduced via cap port 32 and are in fluid communication with the lumens of the hollow fibers via headspace 30 (this path defines the tube side). The entrained gas is drawn from the liquid across the membranes and exits via cap port 32.

In accordance with at least certain embodiments, aspects or objects, an inventive membrane contactor includes: a cap has an internally beveled surface and a cap port; a cup body has an externally beveled surface in sealing engagement with the internally beveled surface, a side port on a side of the cup body and an end port located on an end of the cup body; and a membrane cartridge is located within the cup body, is sealed to an open end of the cup body, and is in sealed fluid communication with the end port, and an inventive method of making a membrane contactor includes the steps of: sealingly mating a perforated center of a membrane contactor with the end port of a cup body; sealingly joining an end of the membrane cartridge adjacent an open end of the cup body; and sealingly joining a beveled surface of the cap to a beveled external surface of the cup body.

The present invention may be embodied in other forms without departing from the spirit and the essential attributes thereof, and, accordingly, reference should be made to the appended claims, rather than to the foregoing specification, as indicated the scope of the invention.

We claim:

1. A single weld membrane contactor comprising:
a cap having an open end, a closed end with a cap port, and an internally facing joining surface;
a cup body having an open end, a closed end, and an externally facing joining surface in a single weld sealing engagement with the internally facing joining surface of the cap; the cup body having a side port on a side of the cup body, and an end port located on an end of the cup body with the end port having an inwardly projecting nipple with an external mating surface that is beveled;
a membrane cartridge disposed inside the cup body, the membrane cartridge comprising a bundle of hollow fiber membranes surrounding a perforated center tube, the membrane cartridge having a first end and a second end;
the perforated center tube having a plugged second end and an internal mating surface at the first end that is beveled, the beveled internal mating surface of the perforated center tube in sealing engagement with the beveled external mating surface of the inwardly projecting nipple;
the bundle of hollow fiber membranes being closed at the first end and open at the second end; and
a potting material located between the cup body and the membrane cartridge at the second end.

2. The single weld membrane contactor of claim 1 wherein the cap comprises the internally facing joining surface located on a skirt extending from a shoulder and a headspace is located between the shoulder and the closed end with the cap port.

3. The single weld membrane contactor of claim 1 wherein the single weld sealing engagement of the internally facing joining surface and the externally facing joining surface is a scarf joint or a shear joint.

4. The single weld contactor of claim 1 consisting essentially of only a single weld between the cap and the cup, and the potting material between the cup body and the membrane cartridge is present only at the second end.

5. A method of removing an entrained gas from a gas entrained liquid comprising:

feeding the gas entrained liquid to the end port of the single weld contactor of claim 1 such that it travels along the perforated center tube until blocked by the plugged second end;

the gas entrained liquid exits the perforated center tube and travels radially across the external surfaces of the hollow fiber membranes and exits the single weld contactor through the side port;

introducing a vacuum to the lumens of the hollow fiber membranes via the cap port; and drawing the entrained gas from the gas entrained liquid across the hollow fiber membranes and exiting the entrained gas through the cap port.

\* \* \* \* \*